United States Patent [19]

Nagura

[11] Patent Number: 4,628,354
[45] Date of Patent: Dec. 9, 1986

[54] IMAGE DATA TRANSMISSION SYSTEM CAPABLE OF REPRODUCING A HIGH RESOLUTION IMAGE BY THE USE OF A SIMPLE STRUCTURE

[75] Inventor: Riichi Nagura, Tokyo

[73] Assignee: NEC Corporation, Japan

[21] Appl. No.: 712,013

[22] Filed: Mar. 14, 1985

[30] Foreign Application Priority Data

Mar. 15, 1984 [JP] Japan .................................. 59-49830
Jan. 21, 1985 [JP] Japan .................................. 60-8609

[51] Int. Cl.$^4$ ............................................. H04N 7/13
[52] U.S. Cl. ..................................... 358/109; 358/142
[58] Field of Search ............... 358/109, 133, 138, 142, 358/160

[56] References Cited

U.S. PATENT DOCUMENTS 3,660,594  5/1972  Marsh ................................. 358/109
4,139,862  2/1979  Haskell .............................. 358/109
4,198,655  4/1980  Coulomb ........................... 358/109
4,439,788  3/1984  Frame ................................ 358/109
4,496,972  1/1985  Lippmann ......................... 358/109

Primary Examiner—Howard W. Britton
Attorney, Agent, or Firm—Ostrolenk, Faber, Gerb & Soffen

[57] ABSTRACT

In an image data transmission system carried by a craft, an image pickup apparatus (24) picks up optical images from an object zone to produce a succession of first image signals representative of the optical images and a succession of second image signals having a predetermined delay time relative to the first image signals. The first image signals are previously processed by a reference signal generating circuit (44) to monitor frequencies of occurrences for a plurality of levels predetermined from a minimum level to a maximum one and to determine a reference signal necessary for distinguishing the second image signals. Amplitudes of the second image signals are classified by a signal classifying unit (45) with reference to the reference signals into classified image signal successions which falls within at least two amplitude ranges. The classified image signal successions are individually encoded by at least two predictive encoding units (52 and 54) into encoded image signal successions, respectively. The encoded image signal successions are combined by a combining unit (43) into a processed signal succession which is sent to a terrestrial station.

9 Claims, 19 Drawing Figures

IMAGE DATA TRANSMISSION SYSTEM CAPABLE OF REPRODUCING A HIGH RESOLUTION IMAGE BY THE USE OF A SIMPLE STRUCTURE

BACKGROUND OF THE INVENTION

This invention relates to an image data transmission system for use in combination with a craft, such as a spacecraft, an aircraft, or the like, flying over an object zone which may be a ground surface of the earth or the like.

An image data transmission system of the type described, comprises an image pickup system for sensing the object zone on board a craft flying over the object zone along a flight path. A recent requirement is to provide a topographic or a like image at a high resolution so as to get a precise topography or the like. This requirement gives rise to an increase of a succession of image signals picked up on board the craft. Such an image data transmission system is therefore in need of data compression process. As a typical one of such data compression processes, a predictive encoding unit is well known. As will later be described with reference to a few figures of the accompanying drawing, a conventional predictive encoding unit is hard to follow a drastic amplitude variation of image signals.

SUMMARY OF THE INVENTION

It is therefore an object of this invention to provide an image data transmission system which is capable of effectively deriving a high resolution image of an object zone by a simple structure.

It is another object of this invention to provide an image data transmission system which is capable of following a drastic amplitude variation of image signals.

An image data transmission system according to this invention is for use in combination with a craft capable of flying along a flight path over an object zone. The image data transmission system comprises an image pickup apparatus carried by the craft for picking up optical images from the object zone to produce a succession of first image signals representative of the optical images and a succession of second image signals having a predetermined delay time relative to the first image signals and image processing circuit for processing the first and the second image signal successions into a processed signal succession. Each of the first and the second image signals has a variable amplitude in dependency upon the optical images. The image processing circuit comprises a classifying circuit responsive to the first and the second image signal successions for classifying the amplitudes of the second image signals into classified image signal successions falling within a predetermined number of amplitude ranges which are determined with reference to the first image signal succession, respectively. The image data transmission system further comprises an encoding circuit coupled to the classifying circuit for individually encoding the classified image signals into encoded signal successions, respectively, and combining unit for combining the encoded signal successions into the processed signal succession.

DESCRIPTION OF THE PREFERRED EMBODIMENTS

Figure 1:
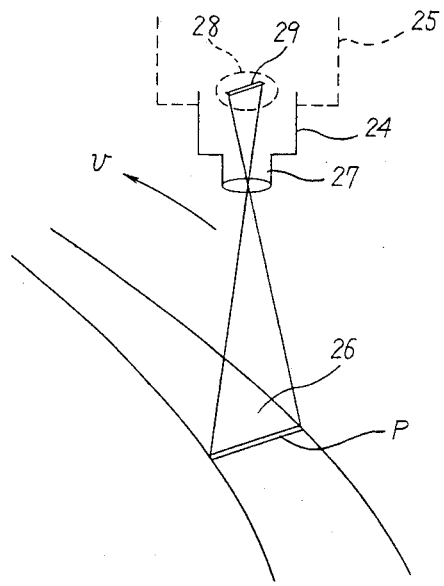
FIG. 1 is a schematic view of a topographic area and a craft for use in describing a conventional image pickup system.
Figure 2:
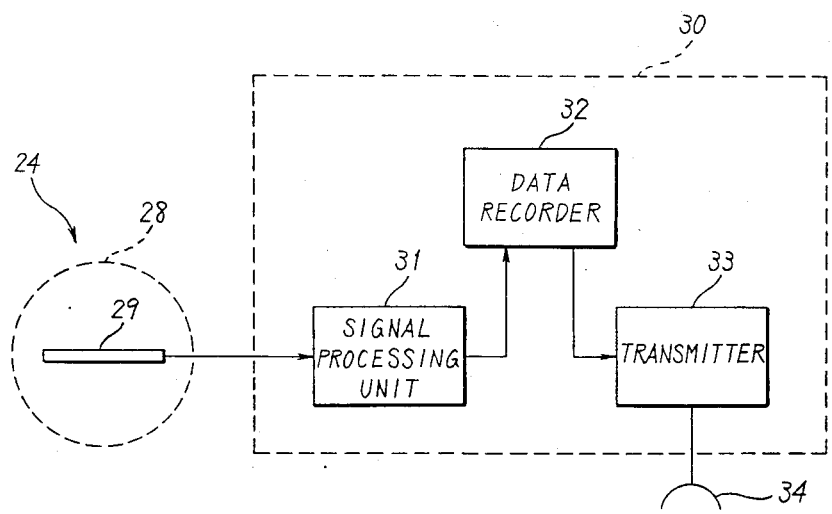
FIG. 2 is a block diagram of a conventional image data transmission system.

Referring to FIGS. 1 and 2, description will be made as regards a conventional image data transmission system and a conventional image pickup system in order to facilitate an understanding of this invention.

Referring to FIG. 1, an image pickup system comprises an image pickup apparatus 24 carried on a spacecraft or a like craft which is symbolically depicted at 25.

It is assumed that the craft 25 flies over an object zone 26 at a velocity v (meter/second) along a flight path and that the image pickup apparatus 24 serves to pick up an optical image from the object zone 26 as will later become clear as the description proceeds. The apparatus 24 comprises an optical system 27 directed towards the object zone 26. The optical system 27 has a focussing area 28. The object zone 26 is divided transversely of the flight path into a plurality of partial zones from which a plurality of optical images are picked up, respectively. One of the partial zones lies right under the craft 25 as a "right under partial zone P".

A photoelectric transducing member 29 is disposed on the focussing area 28 to transduce the optical images into electrical signals. The photoelectric transducing member 29 may be, for example, a linear array of charge coupled devices known as CCD. The optical system 27 picks up the optical images from the partial zone P to focus the same on the photoelectric transducing member 29.

Referring to FIG. 2 together with FIG. 1, the photoelectric transducing member 29 is for use in combination with a signal processing circuit 30. The signal processing circuit 30 comprises a signal processing unit 31 for encoding the electrical signals derived from the photoelectric transducing member 29 into a succession of encoded image data. Depending on the circumstances, the encoded data may be called image signals. A data recorder 32 is for storing the encoded image data succession.

A transmitter 33 is for reading the encoded image data succession out of the data recorder 32 and for transmitting the encoded image data succession through an antenna 34 towards a terrestrial station (not shown) as a digital image data succession. The encoded data succession is accumulated in the data recorder 32 while the craft 25 is at a flight position from which it is impossible to send the encoded image data to the terrestrial station. In any event, the optical images of the partial zone P are transduced to the electrical signals by the photoelectric transducing member 29 and are transmitted in the form of the digital image data succession from the signal processing circuit 30 to the terrestrial station.

Figure 3:
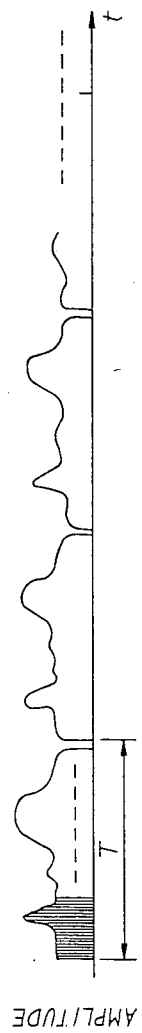
FIG. 3 is a view for use in describing an image signal succession produced in the image pickup system illustrated in FIG. 1.
Figure 4:
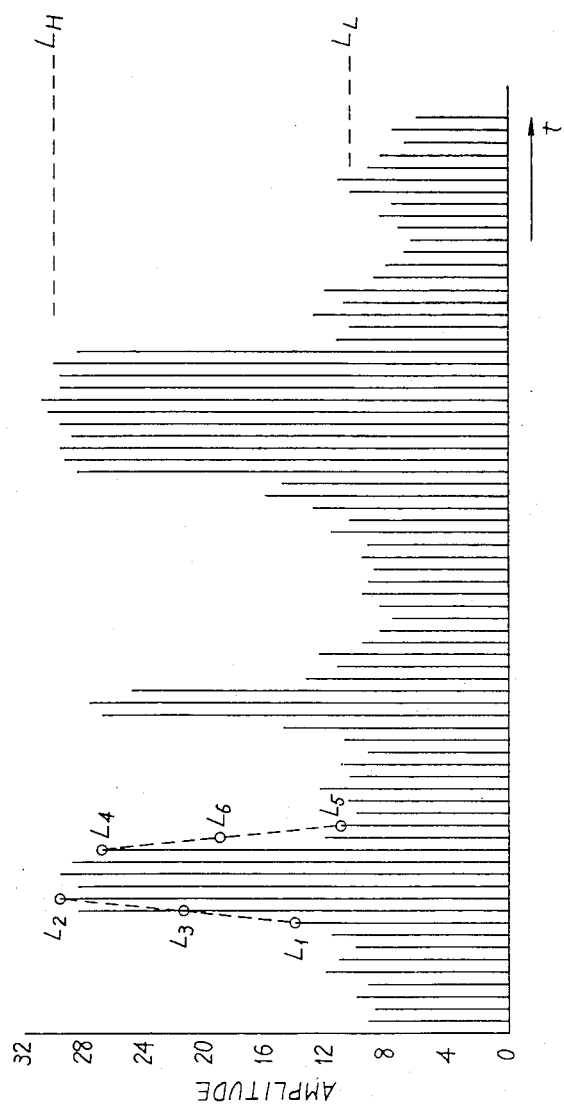
FIG. 4 is a detailed view of a part of the image signal succession illustrated in FIG. 3.

Turning to FIGS. 3 and 4, a succession of the image signals is exemplified which is produced as the electrical signals by the photoelectric transducing member 29. The image signals appear in synchronism with a predetermined sampling pulse sequence having a sampling frequency and have amplitudes variable in proportion to the optical images received by the photoelectric transducing member 29. The image signal succession can be obtained by scanning the photoelectric transducing member 29 with a scanning period T by the use of the sampling pulse sequence. At any rate, it is possible to understand that the illustrated image signal succession is subjected to pulse amplitude modulation. It is assumed that the image of cloud or snow is represented by the image signals having amplitudes near to a first predetermined level $L_H$. Likewise, a land image is represented by the image signals having amplitudes near to a second predetermined level $L_L$.

In order to transmit data at a restricted data speed, the image data transmission system requires a data compression process. A predictive encoding unit is often used for the data compression process. The predictive encoding unit preliminarily predicts from a current or present amplitude of the image signal a next following amplitude thereof as a predicted amplitude and encodes a differential component between the current and the predicted amplitudes as well known in the art.

The amplitudes of the illustrated image signal succession (FIG. 4) are abruptly and drastically varied with time, as readily understood from the above. Under the circumstances, the conventional predictive encoding unit is hard to follow a drastic amplitude variation which rises from a low level $L_1$ to a high level $L_2$ or falls from another high level $L_4$ to another low level $L_5$. As a result, the drastic amplitude variation of the image signal causes level deviations between the predicted level depicted at $L_3$ and a real level of the first-mentioned low level $L_2$ or between the predicted level of $L_6$ and a real level of the last-mentioned low level $L_5$, respectively.

Figure 5:
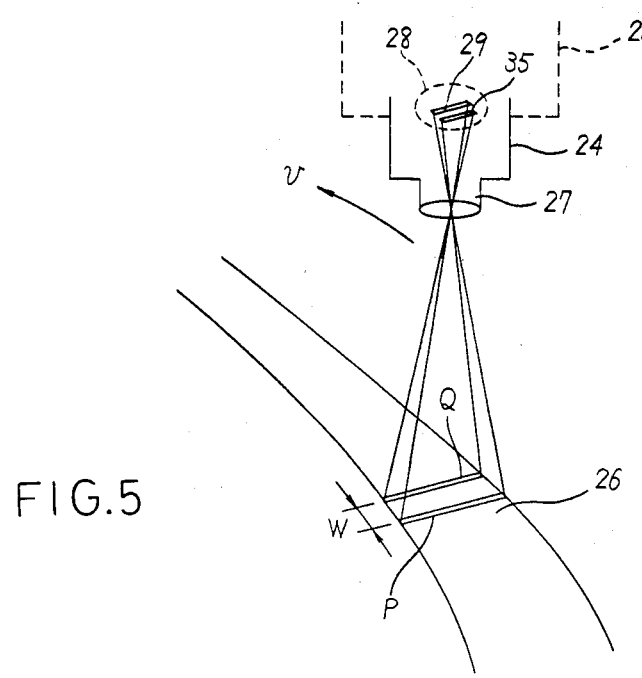
FIG. 5 is a schematic view for use in describing an image pickup system operable as a part of this invention.

Referring now to FIG. 5, description will be made of an image pickup system for use as a part of an image data transmission system according to this invention. The image pickup system comprises similar parts designated by like reference numerals. The image pickup apparatus 24 is carried on the craft 25 flying over the object zone 26 at the velocity v along a flight path.

The apparatus 24 comprises the optical system 27 directed towards the object zone 26. The optical system 27 forms optical images of the object zone 26 on the focussing area 28. The photoelectric transducing member 29 and an additional photoelectric transducing member 35 are disposed in parallel on the focussing area 28 transversely of the flight path. The additional photoelectric transducing member 35 is scanned simultaneously with the first-mentioned photoelectric transducing member 29.

With this structure, the object zone 26 is divided transversely of the flight path into a plurality of partial zones. Partial optical images are picked up to be focussed on the same focussing area 28 from the respective partial zones. By way of example, only the right under partial zone P and a forward partial zone Q are illustrated. The right under and the forward partial zones P and Q are spaced apart from each other at W (meter) along the flight path on the object zone 26. Thus, the photoelectric transducing members 35 and 29 transduce the optical images picked up from the forward partial zone Q and the right under partial zone P to first image signals and second image signals, respectively.

More particularly, the first image signals are derived by the photoelectric transducing member 35 at a time duration $\tau(=W/v)$ (seconds) before the right under partial zone P is picked up by the photoelectric transducing member 29. The first image signals may be regarded as being identical with the second image signals because the time duration $\tau$ is short. The time duration $\tau$ is a predetermined time delay which the second image signals have relative to the first image signals and which is determined primarily by a spacing between the photoelectric transducing members 29 and 35 and additionally by the velocity v, a height of the craft 25 (FIG. 5) over the object zone 26, and a focal length of the optical system 27. The second image signals which will be derived from the photoelectric transducing member 29 after the time duration $\tau$ can be effectively processed with reference to the first image signals derived from the photoelectric transducing member 35.

Figure 6:
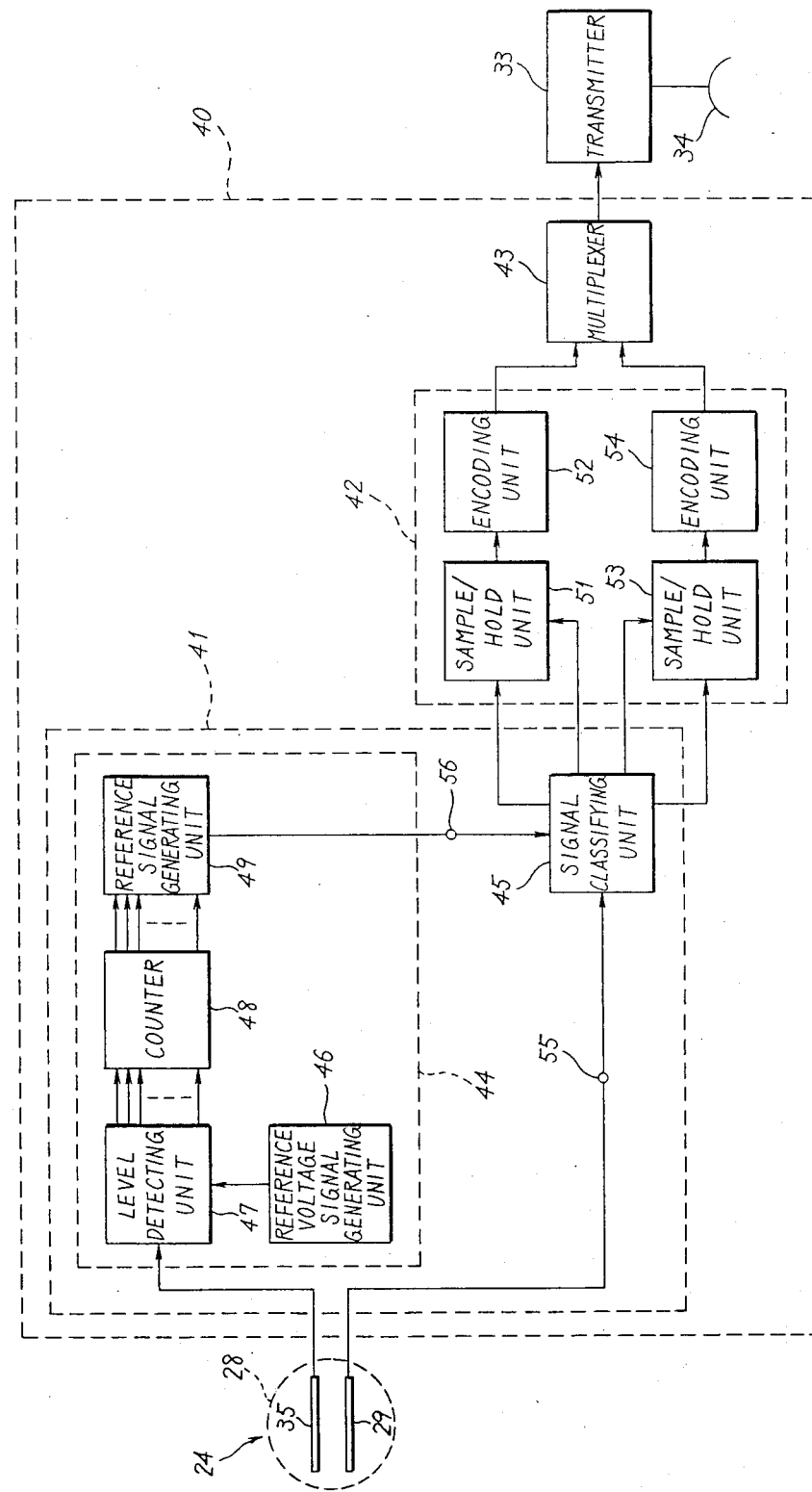
FIG. 6 is a block diagram of an image data transmission system according to a first embodiment of this invention.

Referring to FIG. 6, an image data transmission system according to a first embodiment of this invention comprises the above-mentioned image pickup apparatus 24 and an image processing circuit 40. The photoelectric transducing members 29 and 35 are for use in combination with the image processing circuit 40. The image processing circuit 40 serves as a part of the image data transmission system and comprises a signal classifying circuit 41 for classifying amplitudes of the second image signals into classified image signal successions which fall within a predetermined number of amplitude ranges, such as two amplitude ranges. An encoding circuit 42 is for individually encoding the classified image signals into encoded image signals, respectively. A combining unit or a multiplexer 43 is for combining or multiplexing the encoded image signals into the processed signals.

The classifying circuit 41 comprises a reference signal generating circuit 44 for generating a reference signal to define the two amplitude ranges and a classifying unit 45 for classifying the amplitudes of the second image signals into the two classified image signals.

The reference signal generating circuit 44 comprises a reference voltage signal generating unit 46 for generating a plurality of reference voltage signals, $(n-1)$ in number. The number n is thirty-two for the example depicted in FIG. 4. A level detecting unit 47 is for detecting each level of the first image signals to provide a plurality of amplitude ranges, n in number, with reference to the reference voltage signals. A counter 48 and a reference signal generating unit 49 are for producing the reference signal in the manner which will presently become clear.

The encoding circuit 42 comprises a sample/hold unit 51, an encoding unit 52 for encoding the classified image signals within one of the two amplitude ranges, another sample/hold unit 53, and another encoding unit 54 for encoding the classified image signals within the other of the two amplitude ranges.

The first image signals derived from the photoelectric transducing member 35 are supplied to the level detecting unit 47. The level detecting unit 47 serves like a pulse-height analyzer or A/D converter of a parallel comparison type well known in the art. The level detecting unit 47 divides each first image signal into one of the n amplitude ranges. The counter 48 is for counting the numbers of the divided image signals in the respective amplitude ranges during a predetermined duration, for example, a scanning or time period T (FIG. 3) of the photoelectric transducing member 35.

Figure 7:
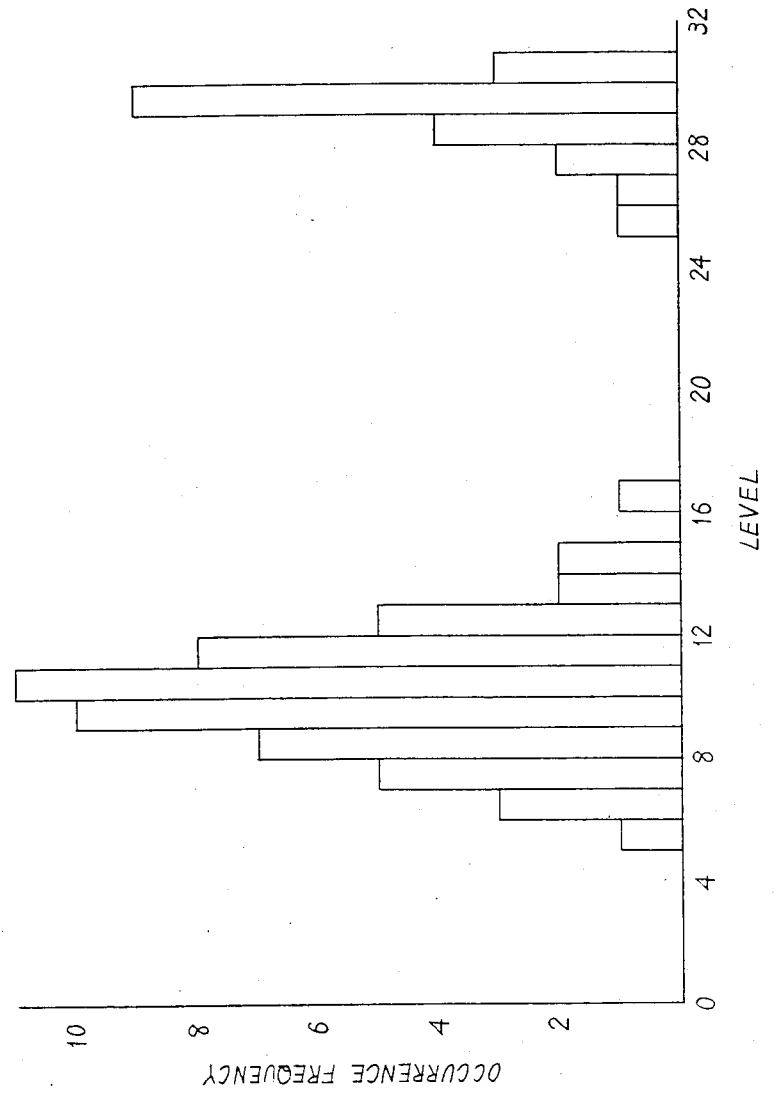
FIG. 7 is a histogram illustrative of an amplitude distribution of the image signal succession illustrated in FIG. 4.

Referring to FIG. 7, the counter 48 produces the numbers in the manner therein when the first image signals have the amplitudes exemplified in FIG. 4. If the cloud partially hangs over the object zone 26, the first image signals have two peaks of frequencies of occurrence at low and high amplitudes, as shown in FIG. 7. Thus, the first image signals have not a uniform amplitude distribution but exhibits a double-humped distribution. Accordingly, the first image signals can be classified into a high amplitude image signal group and a low amplitude image signal group by selecting a preferable threshold level intermediate between the high and the low amplitudes $L_H$ and $L_L$ (FIG. 4).

In order to determine the threshold level according to the numbers given by the counter 48, various methods are proposed in the art. As a simple method, the amplitudes which more frequently appear are collectively discriminated from the amplitudes which less frequently appear. The more and the less frequently appearing amplitudes are classified into the image signal groups of the high amplitude and the low amplitude with the threshold level set at an average value between the more and the less frequently appearing amplitudes. With respect to the characteristic depicted in FIG. 7, the most and the least frequently appearing amplitudes are level 11 and level 30, respectively. The threshold level may therefore be set at a level $(30+11)/2=20.5$. The reference signal generating unit 49 may carry out the above-mentioned operation and generates as the reference signal a threshold level signal representative of the threshold level.

In another method, the threshold level is precisely determined in comparison with the above-mentioned method. More particularly, the least frequently appearing amplitude may be determined between the high amplitude signal group and the low amplitude signal group. In this event, a provisional threshold level is preliminarily determined by a predictive calculation with reference to a quantity of incident light in the optical system. With respect to the characteristic depicted in FIG. 7, the provisional threshold level is set to one level between the levels 14 and 26. In general, the provisional threshold level is determined between a half and four-fifth of a maximum level of the image signals which is equal to the level 32 in FIG. 7.

Under the circumstances, the reference signal generating unit 49 determines a true threshold level by monitoring counts or numbers of the counter 48 which indicate frequencies of occurrence in the respective levels. The true threshold level may be specified by one of the levels that has a minimum frequency of occurrence between the high and the low signal groups. For this purpose, comparison of the frequencies of occurrence is successively made between the provisional threshold level and adjacent ones of the levels to the provisional threshold level so as to decide the one level of the minimum frequency of occurrence and to regard the one level as the true threshold level. The true threshold level is produced as the reference signal.

As shown in FIG. 7, the minimum frequency of occurrence may appear over a plurality of the levels, such as 18 through 25, continuous to one another. A middle one of the continuous levels may be decided as the true threshold level. In the example being illustrated, the true threshold level may be 21.5 which is equal to a half of the sum of 18 and 25.

If the first image signals exhibit no double-humped distribution, the threshold level is set to a level equal to the maximum amplitude of the first image signals. The threshold level is renewed each time when the counter 48 is renewed at a preselected period, for example, the scanning period T.

Referring back to FIG. 6 again and to FIGS. 8 and 9 afresh, the reference signal is sent to the signal classifying unit 45. The signal classifying unit 45 has a first input terminal 55 for receiving the second image signals (as shown in FIG. 9(a)), a second input terminal 56 for receiving the reference signal, and a third input terminal 57 (FIG. 8) for receiving sampling pulses as illustrated in FIG. 9(c). The sampling pulses are supplied in synchronism with the second image signals from a sampling pulse generator (not shown) as known in the art. The classifying unit 45 comprises a comparator 58 and an inverter 59 and AND gates 60 and 61 operable in response to the sampling pulses. The comparator 58 compares the amplitude of each second image signal with the reference signal level and produces, as a comparator output signal, a logic level "1" when the amplitude of the second image signal exceeds the reference signal level, as illustrated in FIG. 9(b). Otherwise, a logic "0" level is produced from the comparator 58. The comparator output signal is delivered direct to the AND gate 60 and to the AND gate 61 through the inverter 59.

Inasmuch as the AND gates 60 and 61 are supplied with the sampling pulses as mentioned before, the comparator output signals are sent as a first additional sampling pulse sequence through the AND gate 60 to the sample/hold unit 51 in timed relative to the sampling pulses, as illustrated in FIG. 9(d), when the comparator output signal takes the logic "1" level. Otherwise, the comparator output signal is sent as a second additional sampling pulse sequence through the inverter 59 and the AND gate 61 to the sample/hold unit 53, as illustrated in FIG. 9(e).

The first and the second additional sampling pulses serve to further sample high amplitude ones of the image signals and low amplitude ones of the image signals, respectively, in a manner to be described later.

The sample/hold unit 51 holds a level of a current one of the image signals in response to the first additional sampling pulse sequence. In other words, a former level is kept in the sample/hold unit 51 as long as the first additional sampling pulse sequence is not received. More specifically, the levels of the second image signals $S_1$, $S_2$, and $S_3$ are held in the sample/hold unit 51 in response to the first additional sampling pulses $P_1$, $P_2$, and $P_3$ appearing at each of time instants $t_1$, $t_2$, and $t_3$, respectively. For example, the level kept at the time instant $t_4$ lasts until a time instant $t_7$, as illustrated in FIG. 9(f). Similarly, the sample/hold unit 53 holds the level of the current second image signal in response to the second additional sampling pulses. Each level lasts during absence of the second additional sampling pulse, as shown in FIG. 9(g). Thus, the sample/hold units 51 and 53 produce first and second step-shaped signals (FIGS. 9(f) and 9(g)) corresponding to variations of the high amplitude and the low amplitude image signal groups, respectively.

As described above, if the threshold level is equal to the maximum amplitude of the first image signals, all of the second image signals pass through the sample/hold unit 53 as the second step-shaped signal.

With respect to the first and the second step-shaped signals, the variation of levels is extremely small as compared with amplitude differences between two adjacent ones of the second image signals depicted in FIG. 9(a). For example, a maximum one of the amplitude differences may be assumed to be equal to 30, as understood from FIG. 7. On the other hand, a maximum one of the level variations of each of the first and the second step-shaped signals (FIGS. 9(f) and 9(g)) is equal to 3 or 4. Accordingly, the encoding units 52 and 54 (FIG. 6) readily and faithfully trace the level even when they are similar to conventional predictive encoders such that quantized signals are represented by a few bits. As a result, encoding can be carried out in each of the encoding units 52 and 54 with a high precision. Anyway, the encoding units 52 and 54 deliver first and second encoded image signals to the multiplexer 43, respectively.

Figure 9:
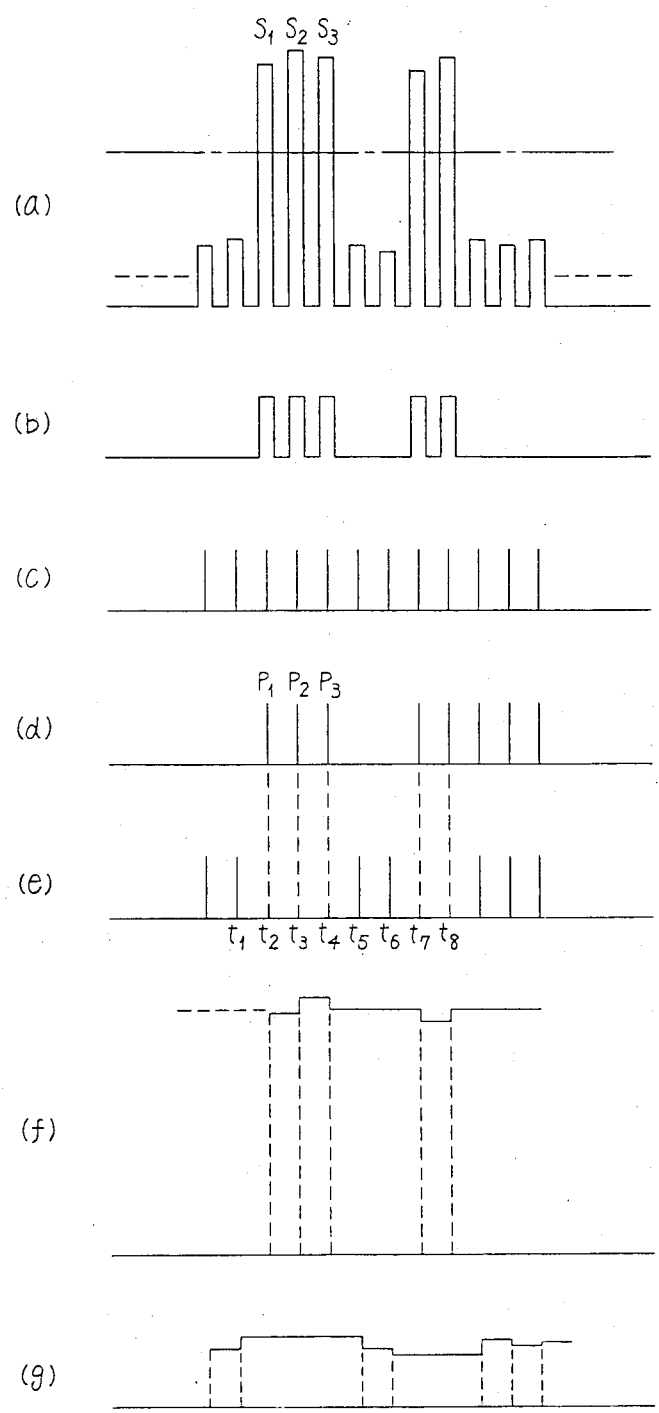
FIG. 9 shows waveforms for use in describing operation of the signal classifying unit illustrated in FIG. 8.
Figure 10:
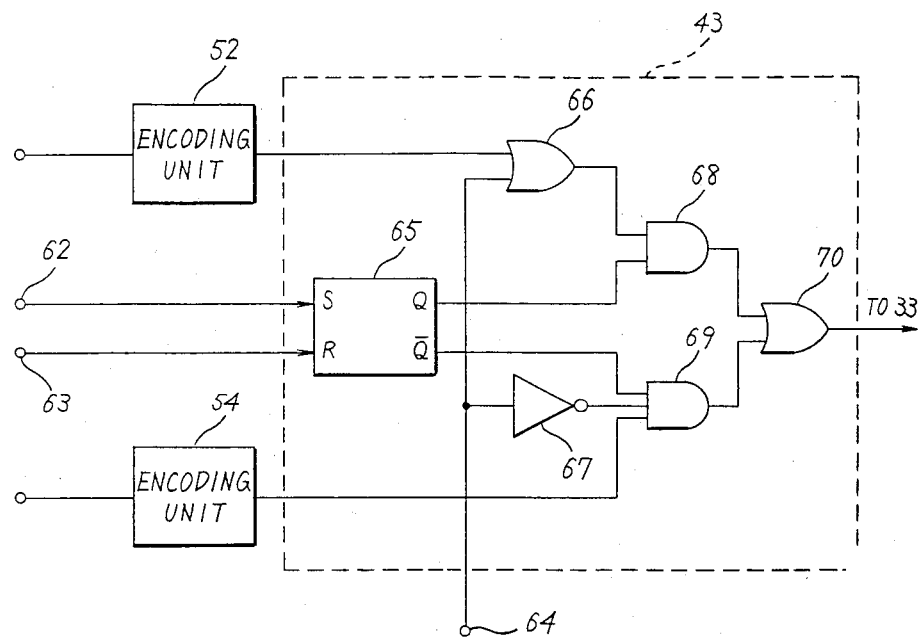
FIG. 10 shows a block diagram of a combining unit operable as another part of the image data transmission system illustrated in FIG. 6 together with a pair of encoding units.

Referring to FIG. 10 together with FIG. 6, the multiplexer 43 has first and second input terminals 62 and 63 for receiving the first and the second additional sampling pulses (FIGS. 9(d) and 9(e)), respectively, and a third input terminal 64 for receiving discrimination pulses as will become clear presently. The multiplexer 43 comprises an R-S flip-flop circuit 65, an OR gate 66, an inverter 67, AND gates 68 and 69, and an output OR gate 70.

Figure 11:
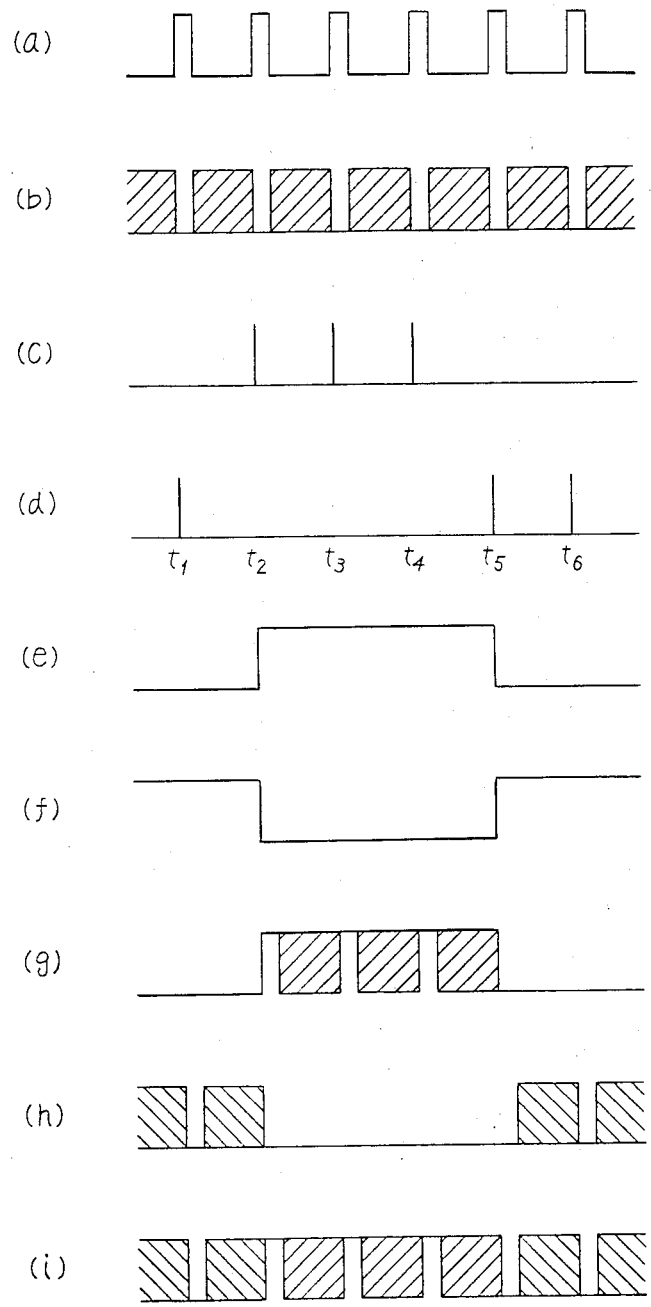
FIG. 11 shows waveforms for use in describing operation of the combining unit illustrated in FIG. 10.

Referring to FIG. 11 together with FIG. 10, the multiplexer 43 cooperates with the encoding units 52 and 54 in response to the discrimination pulses produced in synchronism with the sampling pulses illustrated in FIG. 9(c). The discrimination pulses serve to discriminate between the first encoded image signals (FIG. 11(b)) and the second encoded image signals (FIG. 11(c)) when received at the terrestrial station as will later be described in detail. The discrimination pulses may be either identical with the sampling pulses or delayed relative to the sampling pulses and are placed at positions illustrated in FIG. 11(a).

The first and the second encoded image signals should be arranged in hatched areas, with a time interval left between two adjacent ones of the hatched areas, as illustrated in FIG. 11(b). The first and the second additional sampling pulses are coincident with those illustrated in FIGS. 9(c) and 9(d), respectively, and synchronized with the leading edges of the discrimination pulses. Under the circumstances, the R-S flip-flop circuit 65 is set and reset by the first and the second additional sampling pulses supplied to set and reset terminals S and R, respectively. Thus, the R-S flip-flop circuit 65 delivers a first output signal depicted in FIG. 11(e) to the AND gate 68 through a positive output terminal Q. The R-S flip-flop circuit 65 also supplies the AND gate 69 from a negative output terminal $\bar{Q}$ with a second output signal having an inverse phase relative to the first output signal as depicted in FIG. 11(f).

Enabled by the first output signal, the AND gate 68 produces a first combination of the first encoded image signals and the discrimination pulse during presence of the first output signal as depicted in FIG. 11(g). The discrimination pulse takes a logic "1" level. On the other hand, the AND gate 69 is enabled by the second output signal and supplied with an inverted discrimination pulse through the invertor 67. Accordingly, the AND gate 69 produces a second combination of the second encoded image signals and the inverted discrimination pulse during presence of the second output signal as depicted in FIG. 11(h). The output OR gate 70 unites the first and the second combinations in the manner illustrated in FIG. 11(i) into a combined signal. Furthermore, the line synchronizing pulse is added to the combined signal in the multiplexer 43 as well known in the art.

Referring back to FIG. 6, the transmitter 33 adds a line synchronizing pulse to the combined signal to produce the processed signal. The processed signal is transmitted as the image data succession through the antenna 34 towards the terrestrial station.

Figure 12:
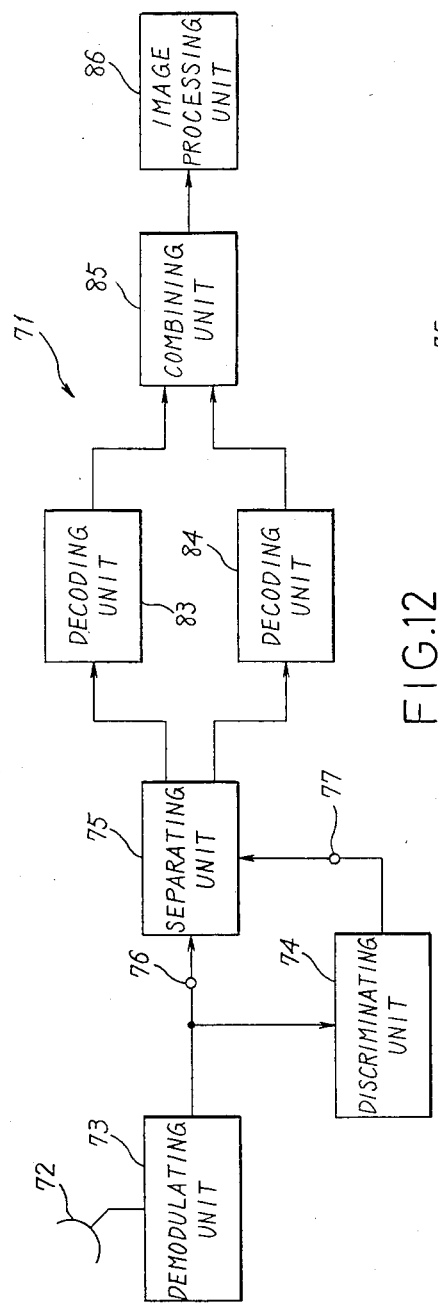
FIG. 12 is a block diagram of a terrestrial station for use in combination with the image data transmission system illustrated in FIG. 6.

Referring to FIG. 12, a terrestrial station 71 serves as a part of the image data transmission system.

The image data succession transmitted from the craft is received at an antenna 72 and sent to a demodulating unit 73 so as to be demodulated into a demodulated image data succession. A discriminating unit 74 extracts the discrimination pulse from the demodulated image data succession by the use of the line synchronizing pulse. The demodulated image data succession and the extracted discrimination pulse are sent to a separating unit 75.

Figure 13:
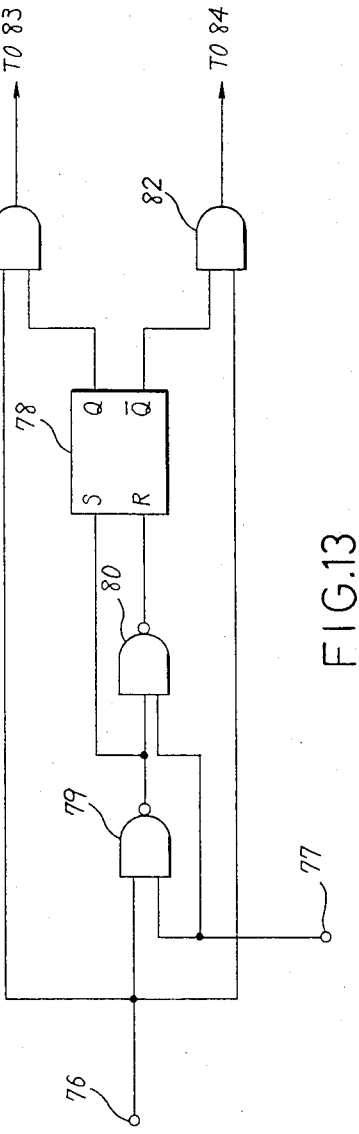
FIG. 13 is a block diagram of a separating unit operable as a part of the terrestrial station illustrated in FIG. 12.

Referring to FIG. 13, the separating unit 75 has a first input terminal 76 for receiving the demodulated image data succession and a second input terminal 77 for receiving the extracted discrimination pulse. The separating unit 75 comprises an R-S flip-flop circuit 78, NAND gates 79 and 80, and AND gates 81 and 82. The NAND gate 79 delivers a set pulse to the R-S flip-flop circuit 78 when the extracted discrimination pulse included in the demodulated image data succession is a negative going pulse. The NAND gate 80 delivers a reset pulse to the R-S flip-flop circuit 78 when the extracted discrimination pulse included in the demodulated image data succession is a positive going pulse. Accordingly, the AND gate 81 produces the demodulated image data succession which follows the negative going pulse. On the contrary, the AND gate 82 produces the demodulated image data succession which follows the positive going pulse. As a result, the AND gate 81 is enabled only when the demodulated image data succession conveys the low amplitude image signals. The AND gate 82 is enabled only when the demodulated image data succession carries the high amplitude image signals.

Referring back to FIG. 12, the low amplitude image signals are sent to a decoding unit 83 to be decoded into a decoded low amplitude image data succession. Likewise, a decoding unit 84 decodes the high amplitude image signals into a decoded high amplitude image data succession. A combining unit 85 combines the decoded low amplitude image data succession with the decoded high amplitude image data succession into a reproduced image signal succession which is processed in an image processing unit 86 in the manner known in the art. For example, the reproduced image signal succession is subjected to waveform shaping to be recorded in a storage unit (not shown).

Figure 14:
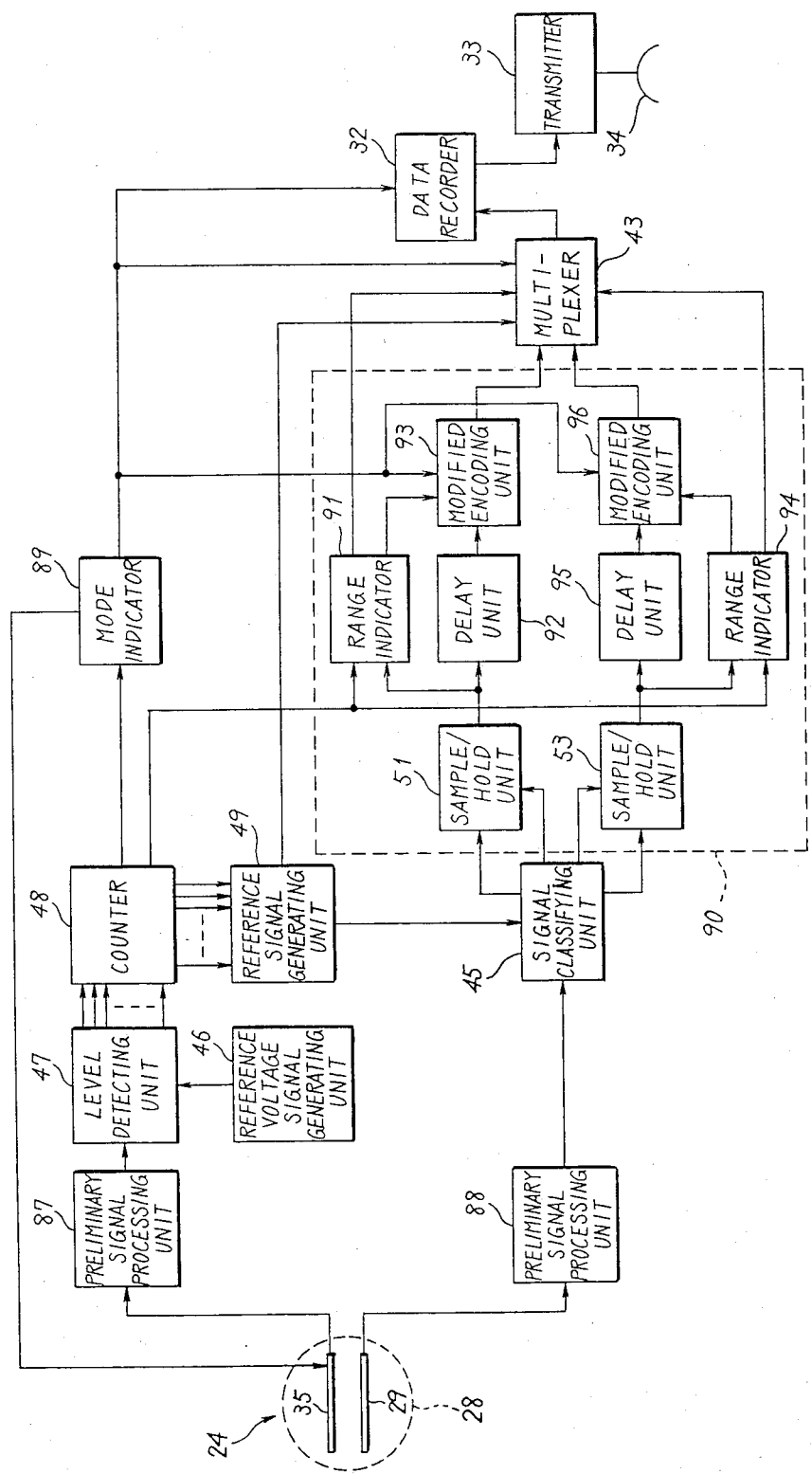
FIG. 14 is a block diagram of an image data transmission system according to a second embodiment of this invention.

Referring to FIG. 14, an image data transmission system according to a second embodiment of this invention comprises similar parts designated by like reference numerals. The illustrated image data transmission system comprises a pair of preliminary signal processing units 87 and 88, a mode indicator 89, and a modified encoding circuit 90, all of which will be described in detail in the following.

The electrical signals derived from the photoelectric transducing members 35 and 29 are subjected to amplification, filtering, waveform shaping, and the like in the first and the second preliminary signal processing units 87 and 88, respectively, and are delivered as the first and the second image signal successions to the level detecting unit 47 and the signal classifying unit 45, respectively. The first image signal succession is sent through the level detecting unit 47 to the counter 48. In the manner described above, the counter 48 individually counts the numbers of the respective divided image signals in the respective ones of the n amplitude ranges within the time period T. The numbers counted for the respective amplitude ranges are delivered to the reference signal generating unit 49 and to the mode indicator 89. The counter 48 furthermore generates a time signal which lasts during count of the counter 48 and sends the time signal to the modified encoding circuit 90 as will become presently clear.

The mode indicator 89 is operable in cooperation with the modified encoding circuit 90, the multiplexer 43, and the counter 48 in a manner to be described later.

The reference signal generating unit 49 delivers the reference signal to the signal classifying unit 45 in response to the numbers of the counter 48 as described before. The illustrated reference signal generating unit 49 produces an additional reference signal for representing that the second image signals are classified into the high amplitude image signal group and the low amplitude image signal group during presence of the reference signal indicative of a reference level for use in classifying the second image signals into the two amplitude ranges.

The modified encoding circuit 90 comprises a first sample/hold unit 51 and a second sample/hold unit 53 both of which are similar to those illustrated with reference to FIG. 6. The modified encoding circuit 90 further comprises a first range indicator 91, a first delay unit 92, a first modified encoding unit 93, a second range indicator 94, a second delay unit 95, and a second modified encoding unit 96, all of which will become clear. For the time being, it may be understood that the first and the second modified encoding units 93 and 96 can change quantization steps in a manner to be described.

Let the preliminary signal processing unit 88 comprise an A/D converter. In this event, the signal classifying unit 45 receives a digitized signal succession. The digitized signal succession is often used in the form of a succession of parallel digitized signals of N bits.

Figure 8:
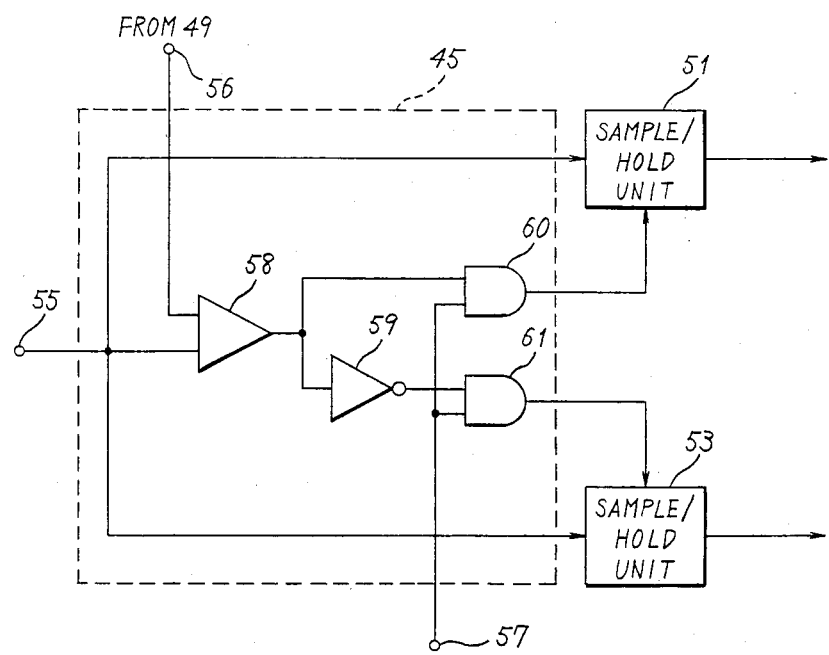
FIG. 8 shows a block diagram of a signal classifying unit operable as a part of the image data transmission system illustrated in FIG. 6 together with a pair of sample/hold units.
Figure 15:
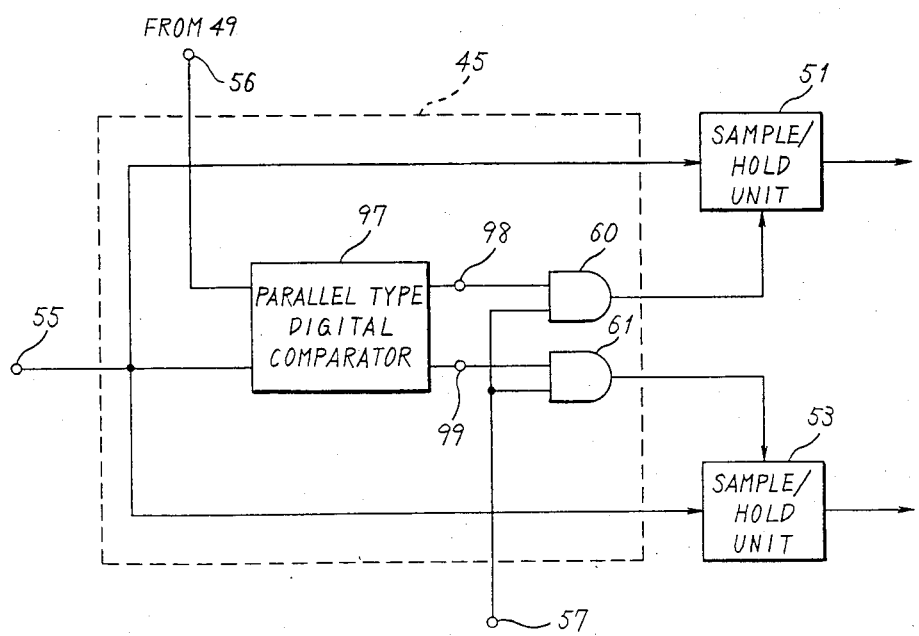
FIG. 15 shows a block diagram of a signal classifying unit operable as a part of the image data transmission system illustrated in FIG. 14 together with a pair of encoding units.

Referring to FIG. 15, the classifying unit 45 is for dealing with the parallel digitized signal succession and comprises a parallel type digital comparator 97 in place of the comparator 58 and the inverter 59 described in conjunction with FIG. 8, the parallel type digital comparator 97 delivers its output to the AND gates 60 and 61.

Referring back to FIG. 14, the reference signal generating unit 49 generates a parallel digitized threshold level signal of N ($=\log_2 n$) bits as the reference signal when the counter 48 stops counting the numbers of the divided image signals in the respective ones of the n amplitude ranges.

In FIG. 15, the parallel digitized signal succession is delivered to the input terminal 55. The parallel digitized threshold level signal is fed to the input terminal 56. The digital comparator 97 compares the parallel digitized signal succession with the parallel digitized threshold level signal and produces an output signal of a logic "1" level from an output terminal 98 when the parallel digitized signal succession exceeds the parallel digitized threshold level signal. On the contrary, the digital comparator 97 produces the output signal of the logic "1" level from another output terminal 99 when the parallel digitized signal succession is less than the parallel digitized threshold level signal. Accordingly, the AND gates 60 and 61 extract the sampling pulses in synchronism with the output signals produced from the output terminals 98 and 99, respectively, and send sampling pulses to the sample/hold units 51 and 53, respectively. Each of the sample/hold units 51 and 53 may be a D-type flip-flop circuit. The sample/hold units 51 and 53 produce the step-shaped signals which are similar to those depicted in FIGS. 9(f) and 9(g) for the high amplitude and the low amplitude image signal groups, respectively.

Figure 16:
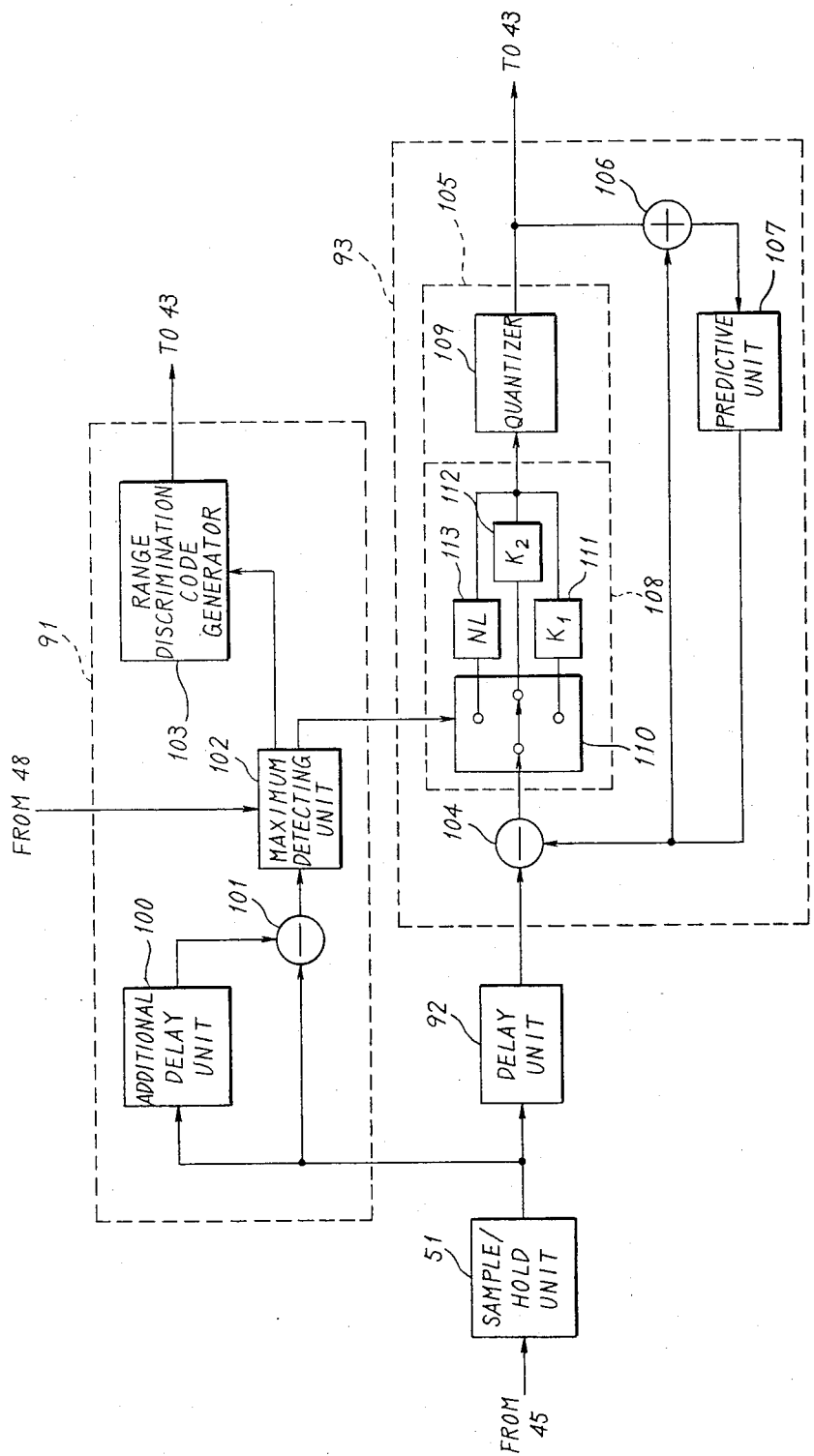
FIG. 16 is a block diagram of a part of a modified encoding circuit operable as another part of the image data transmission system illustrated in FIG. 14.

Referring back to FIG. 14 and FIG. 16 afresh, the modified encoding circuit 90 will be described as regards a part thereof for the sample/hold unit 51. The illustrated part comprises an additional delay unit 100 for giving the step-shaped signal currently delivered from the sample/hold unit 51 as a current step-shaped signal a predetermined period which corresponds to one picture element of the photoelectric transducing member 29 (FIG. 14). The additional delay unit 100 produces a delayed step-shaped signal. A subtracter 101 calculates a difference between the delayed step-shaped signal and the current step-shaped signal and produces a difference signal of a differential level which is equal to the difference. A maximum detecting unit 102 detects a maximum value of the differential levels within a predetermined interval, for example, the time period T in response to the time signal produced by the counter 48 (FIG. 14). A range discrimination code generator 103 is for generating a range discrimination code as will be described later.

The maximum detecting unit 102 compares the current differential level with the former maximum value and detects the current differential level as a new maximum value when the current differential level exceeds the former maximum value. The maximum detecting unit 102 repeatedly carries out the above-mentioned detecting operation in the respective time period T and sends a newest maximum value as a control signal within the time period T to the modified encoding unit 93. The delay unit 92 is for delaying or storing the step-shaped signal produced by the sample/hold unit 51 until the range indicator 91 sends the control signal to the modified encoding unit 93.

The modified encoding unit 93 comprises an additional subtracter 104, a quantization unit 105, an adder 106, and a predictive unit 107 in the manner known in the art. The predictive unit 107 may be a usual predictor for delaying a previous sample.

The quantization unit 105 comprises a switching unit 108 and a quantizer 109. The switching unit 108 is for determining an amplification factor in response to the control signal produced by the range indicator 91. More specifically, the switching unit 108 comprises a switch 110, first and second amplifiers 111 and 112, and a nonlinear amplifier 113. The first amplifier 111 has a first amplification factor $K_1$ greater than a second amplification factor $K_2$ assigned to the second amplifier 112. Anyway, the switching unit 108 serves to switch input-output characteristics of the quantizer 109 from one to another by selecting one of the amplifiers 111 to 113.

For example, when the control signal given from the range indicator 91 is less than a first predetermined value $V_1$, the switch 110 connects the subtracter 104 with the first amplifier 111 of the amplification factor $K_1$ so as to carry out precise quantization. When the control signal exceeds the first predetermined value $V_1$, the switch 110 connects the subtracter 104 with the second amplifier 112. As a result, the quantization can be carried out over a wide range of a subtracter output signal given from the subtracter 104. Moreover, when the control signal exceeds a second predetermined value $V_2$ which is higher than the first predetermined value $V_1$, the switch 110 connects the subtracter 104 with the non-linear amplifier 113. As a result, the quantization can be carried out over a further wide range of the subtracter output signal.

Furthermore, the range discrimination code generator 103 generates the range discrimination code so that the terrestrial station may discriminate a quantizable range of the quantizer 109. The range discrimination code is sent from the range discrimination code generator 103 to the multiplexer 43. For example, three kinds of the range discrimination codes are generated in correspondence to the control signal, namely, the maximum value of the maximum detecting unit 102.

The second range indicator 94 and the second modified encoding unit 96 also operate in a manner similar to the first range indicator 91 and the first modified encoding unit 93, respectively.

As described above, the quantizable range is determined with reference to the maximum value given from the maximum detecting unit 102. Switching of the quantizable range results in an improvement of a follow-up characteristic and quantization quality even when the predictive encoding unit is simple in structure. This means that the quantization bits may be reduced in number.

Figure 17:
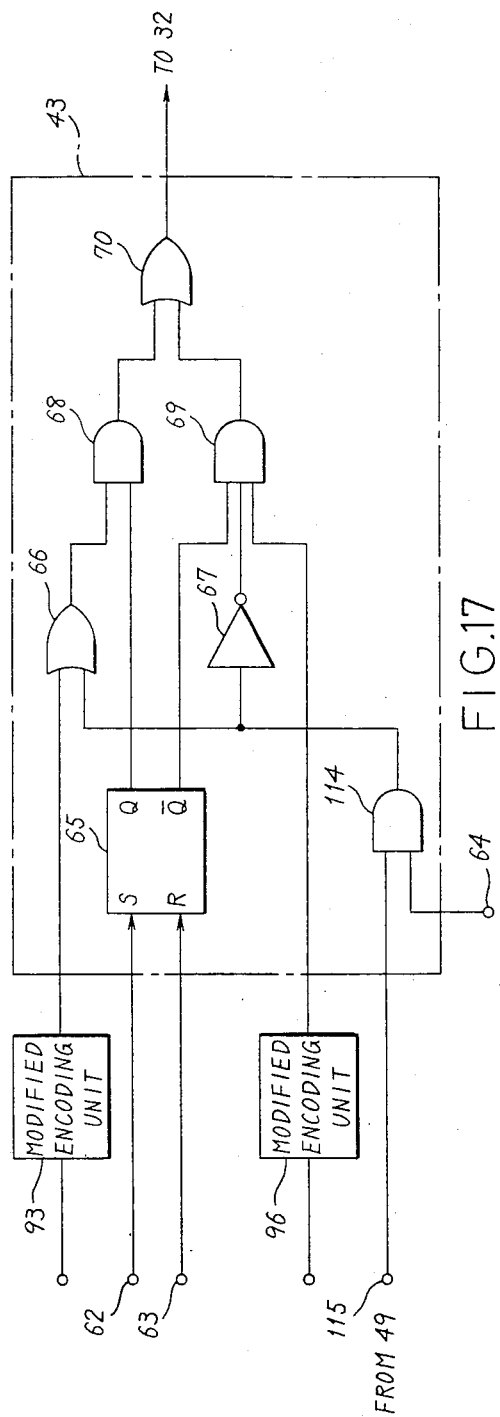
FIG. 17 shows a block diagram of a combining unit operable as still another part of the image data transmission system illustrated in FIG. 14 together with a pair of encoding units.

Referring to FIG. 17, the multiplexer 43 is similar in structure and operation to that illustrated in conjunction with FIG. 8 except for addition of an additional AND gate 114 and an additional input terminal 115. The additional input terminal 115 is supplied with the additional reference signal produced by the reference signal generating unit 49 (FIG. 14).

The reference signal generating unit 49 (FIG. 14) generates the additional reference signal of the logic "1" level when the second image signals should be classified into the high amplitude image signal group and the low amplitude image signal group. Otherwise, the additional reference signal is rendered into the logic "0" level when classification of the second image signals is unnecessary due to the fact that the first image signal succession is continuously rendered into a high or a low amplitude. Accordingly, the AND gate 114 delivers the discrimination pulses only during presence of the additional reference signal produced by the reference signal generating unit 49. Thus, the discrimination pulses are added to the first and the second encoded image signals only when the additional reference signal of the logic "1" level is supplied to the AND gate 114. More specifically, the R-S flip-flop circuit 65 delivers the first output signal of the logic "1" level to the AND gate 68 through the positive output terminal Q in response to the first and the second additional sampling pulses supplied to the set and the reset terminals S and R as described before. The R-S flip-flop circuit 65 also supplies to the AND gate 69 through the negative output terminal $\overline{Q}$ with the second output signal having the inverse phase relative to the first output signal. The AND gate 68 produces the first combination of the first encoded image signals and the discrimination pulse during presence of the first output signal. On the other hand, the AND gate 69 receives the inverted discrimination pulses through the invertor 67. Accordingly, the AND gate 69 produces the second combination of the second encoded image signals and the inverted discrimination pulse during presence of the second output signal. The output OR gate 70 unites the first and the second combinations into the combined signal.

Referring back to FIG. 14, description will be directed to the mode indicator 89. If the image signals are uniformly low in amplitude because of the sea image, the numbers of the counter 48 dominantly indicate the low amplitude ranges. The mode indicator 89 detects a rate of occurrence of the low amplitude image signals to the whole of the image signals appearing within the time period T (FIG. 3) by comparing each image signal with a predetermined amplitude. Moreover, the mode indicator 89 delivers an additional control signal to the modified encoding units 93 and 96, the multiplexer 43, and the data recorder 32 when the occurrence rate exceeds a predetermined rate of, for example, 95%. The encoding units 93 and 96, the multiplexer 43, and the data recorder 32 reduce the data processing speed and the data access speed to one fourth or one fifth.

Thus, a succession of encoded image signals picked up from the land is stored in the data recorder 32 at the high data access speed, while a succession of encoded image signals picked up from the sea is stored at the low data access speed. Since a clock frequency of the data recorder 32 is also reduced at one fourth or one fifth, the encoded image signal succession is stored in the data recorder 32 at a uniform density. As a result, it takes several times to record the encoded image signal succession in the data recorder 32.

Furthermore, observation may be carried out over a wide wavelength band which is divisible into a plurality of partial wavelength bands. The photoelectric transducing members may be provided for the respective partial wavelength bands. In this case, the additional control signal can be produced from the mode indicator 89 and used for switching the wavelength bands.

Figure 18:
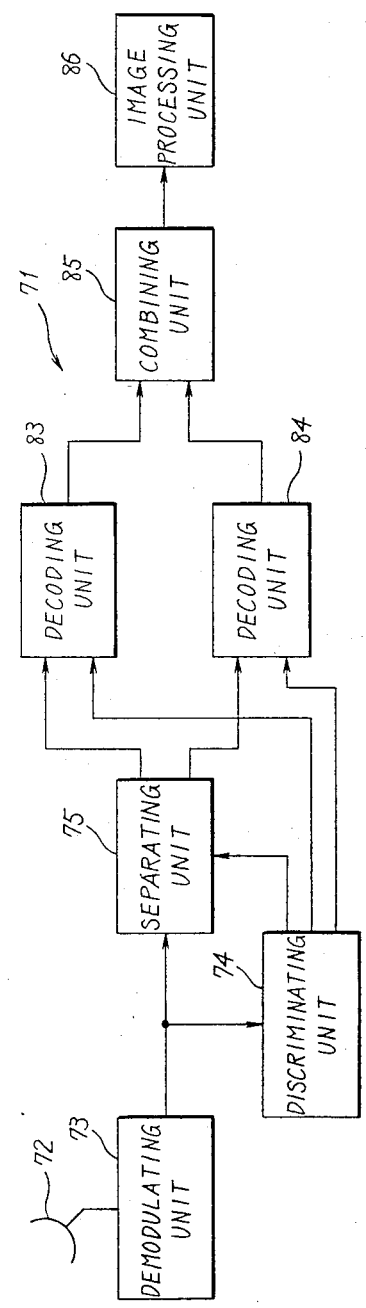
FIG. 18 is a block diagram of a terrestrial station for use in combination with the image data transmission system illustrated in FIG. 14.

Referring to FIG. 18, a terrestrial station 71 is for use in combination with the second embodiment of this invention. Similar parts are designated by like reference numerals.

The image data succession transmitted from the craft is received at the antenna 72. The demodulating unit 73 demodulates the image data succession into the demodulated image data succession. The discriminating unit 74 extracts the discrimination pulses and the range discrimination codes from the demodulated image data succession with reference to the line synchronous pulse. The discrimination pulses are sent to the separating unit 75. The range discrimination codes are delivered to the decoding units 83 and 84. In response to the discrimination pulses, the separating unit 75 separates the demodulated image data succession into the low amplitude image signals and the high amplitude image signals. The low amplitude image signals are sent to the decoding unit 83 while the high amplitude image signals are sent to the decoding unit 84. In response to the range discrimination codes, the decoding units 83 and 84 decode the low amplitude and the high amplitude image signals into the decoded low amplitude and the decoded high amplitude image data successions, respectively. The combining unit 85 combines the decoded low amplitude with the decoded high amplitude image data successions into the reproduced image signal succession. The reproduced image signal succession is processed by the image processing unit 86 in the manner known in the art.

Figure 19:
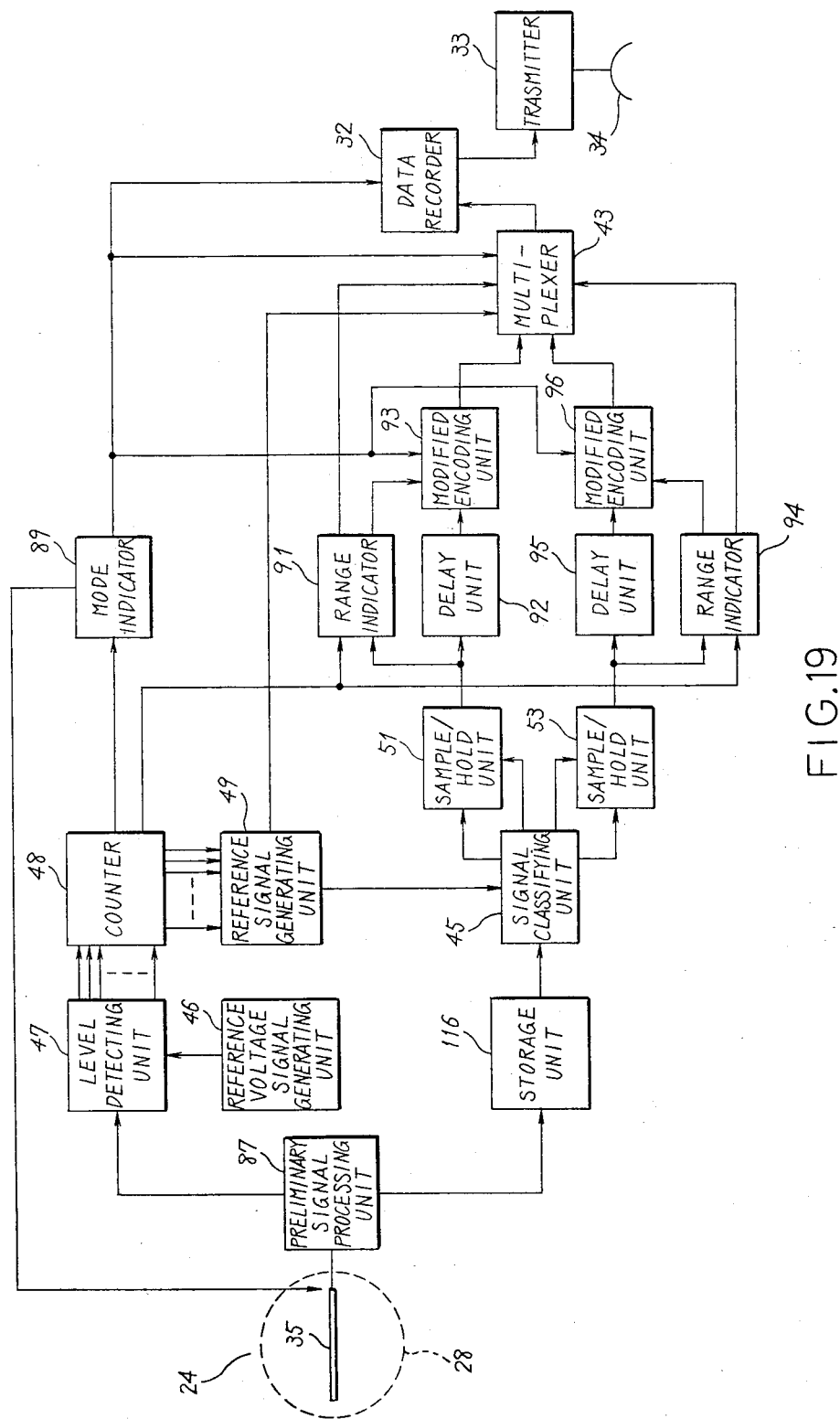
FIG. 19 is a block diagram of an image data transmission system according to a third embodiment of this invention.

Referring to FIG. 19, an image data transmission system according to a third embodiment of this invention is similar to those illustrated with reference to FIG. 14 except that a single photoelectric transducing member 35 alone is used in the image data transmission system illustrated in FIG. 19. The photoelectric transducing member 35 successively produces a succession of first image signals through the preliminary signal processing unit 87 in the manner described in conjunction with FIG. 14.

The first image signal succession is delivered to the level detecting unit 47 in the manner described in FIG. 14 and is also delivered to a storage unit 116 interposed between the preliminary signal processing unit 87 and the signal classifying unit 45. The storage unit 116 is for storing the first image signal succession as stored image signal succession and produces the stored image signal succession with the above-described time duration $\tau$ as the afore-mentioned second image signal succession. The signal classifying unit 45 classifies the second image signal succession into two amplitude ranges in response to the reference signal produced by the reference signal generating unit 49 in the manner described before. The first image signal succession is divided by the level detecting unit 47 into a plurality of amplitude ranges n in the manner described before.

As thus far been described, the image data transmission system according to this invention can carry out the high quality image data compression by simple construction without an addition of a large capacity and high access speed storage.

While this invention has so far been described in conjunction with a few preferred embodiments thereof, it is readily possible for those skilled in the art to put the invention into practice in various other manners. For example, the optical system may be constructed as indicated in a specification of U.S. patent application Ser. No. 639,950 filed Aug. 10, 1984, by Riichi Nagura et al for assignment to NEC Corporation.

In the event that the amplitude distribution of the image signal succession is a triple-humped characteristic, the image signal succession may be classified into three amplitude ranges. Observation may be carried out over a wide wavelength band which is divisible into a plurality of partial wavelength bands. The photoelectric transducing members may be provided for the respective partial wavelength bands. In particular, if the respective partial wavelength bands are near to each other, one predictive photoelectric transducing member may correspond to a plurality of photoelectric transducing members.

What is claimed is:

1. In an image data transmission system for use in combination with a craft capable of flying along a flight path over an object zone, said image data transmission system comprising image pickup means carried by said craft for picking up optical images from said object zone to produce a succession of first image signals representative of the optical images and a succession of second image signals having a predetermined delay time relative to said first image signals and image processing means for processing said first and said second image signal successions into a processed signal succession, each of said first and said second image signals having a variable amplitude in dependency upon said optical images, the improvement wherein said image processing means comprises:
   classifying means responsive to said first and said second image signal successions for classifying said amplitudes of said second image signals into classified signal successions falling within a predetermined number of amplitude ranges which are determined with reference to said first image signal succession, respectively;
   encoding means coupled to said classifying means for individually encoding said classified signals into encoded signal successions, respectively; and
   combining means for combining said encoded signal successions into said processed signal succession.

2. An image data transmission system as claimed in claim 1, wherein said classifying means comprises:
   reference signal generating means responsive to said first image signal succession for generating at least one reference signal of a predetermined threshold level to define at least two amplitude ranges; and
   classifying unit responsive to said at least one reference signal for classifying said amplitudes of said second image signals into said classified signal successions by comparing the amplitudes of said second image signals with said reference signal level.

3. An image data transmission system as claimed in claim 2, wherein said reference signal generating means comprises:
  dividing means responsive to said first image signal succession for dividing amplitudes of said first image signals into divided signal successions falling within second predetermined number of amplitude ranges, respectively;
  counter means coupled to said dividing means for individually counting the numbers of said divided signals during a predetermined time period to produce counts for said divided signals, respectively;
  detecting means coupled to said counter means for detecting a preselected one of said numbers to determine the amplitude of said first image signals and to produce said reference signal for the determined amplitude of said first image signals.

4. An image data transmission system as claimed in claim 3, wherein said encoding means comprises:
  at least two encoding sections equal in number to said amplitude ranges and responsive to the respective classified signal successions for encoding said classified signal successions into said encoded signal successions, respectively.

5. An image data transmission system as claimed in claim 4, wherein each of said encoding sections comprises:
  a sample/hold unit for holding levels of each of said classified signals to produce a succession of level hold signals; and
  an encoding unit responsive to said level hold signal succession for encoding a difference between a current one of said level hold signals and a previous one thereof into each of said encoded signal successions.

6. An image data transmission system as claimed in claim 3, wherein:
  said detecting means further generates a pulse signal by detecting that the image signal successions are to be classified into at least two amplitude ranges;
  said combining means comprising:
  means responsive to said encoded signal successions and coupled to said detecting means for producing said processed signal succession with reference to said pulse signal.

7. An image data transmission system as claimed in claim 5, wherein said encoding unit comprises:
  a range indicator responsive to the succession of said level hold signals for carrying out subtraction between said current level hold signal succession and said previous level hold signal to detect a quantizable range from said subtraction and to produce a control signal indicative of said quantizable range;
  a delay unit coupled to said sample/hold unit for delaying said level hold signal to produce a delayed level hold signal; and
  an encoding unit coupled to said range indicator and said delay unit for encoding said delayed level hold signal into each of said encoded signals with reference to said control signal.

8. An image data transmission system as claimed in claim 1, wherein said image pickup means comprises:
  first photoelectric means for producing said first image signals; and
  second photoelectric means for producing said second image signals.

9. An image data transmission system as claimed in claim 1, wherein said image pickup means comprises:
  single photoelectric means for producing said first image signals; and
  memory means coupled to said single photoelectric means for delaying said first image signals for said predetermined delay time to produce said second image signals.

* * * * *